United States Patent [19]

Natalie

[11] 4,151,758
[45] May 1, 1979

[54] POWER MULTIPLIER

[76] Inventor: Adam J. Natalie, 16919 Bell St., Elsinore, Calif. 92330

[21] Appl. No.: 820,690

[22] Filed: Aug. 1, 1977

[51] Int. Cl.² ........................................... G05G 1/04
[52] U.S. Cl. ..................................... 74/521; 248/277
[58] Field of Search .......................... 74/521; 248/277

[56] References Cited

U.S. PATENT DOCUMENTS

| 428,476 | 5/1890 | Gastrell | 74/521 |
| 1,845,644 | 2/1932 | Bradwell | 74/521 |
| 2,597,861 | 5/1952 | Gerlach | 248/277 |

Primary Examiner—Samuel Scott
Assistant Examiner—Wesley S. Ratliff, Jr.
Attorney, Agent, or Firm—Roger A. Marrs

[57] ABSTRACT

An apparatus is disclosed herein for translating an input power force into an increased power output via power multiplier modules or units. Each multiplier module comprises a scissors arrangement of levers or links having one end fixed and its opposite end movable. The links are advanced and retracted in a scissors action by intermediate links having their opposite ends connected together by pivotal means. The intermediate links are operably moved by differentially rotating wheels which oscillate in a reciprocal manner to advance and retract the links. A power input mechanism is operably coupled to a selected one of the wheels for imparting a driving force thereto. Successive modules or units are driven as slave units from the first unit arranged in a serial or additive arrangement.

5 Claims, 5 Drawing Figures

POWER MULTIPLIER

BACKGROUND OF THE INVENTION

1. Field of the Invention

This invention relates to power translating mechanisms and more particularly to a novel mechanism for increasing the power derived from an input source via a series of multiplying modules or units.

2. Description of the Prior Art

In the past, extensive and complex mechanisms have been provided for interconnecting a power source with a work load whereby the work load is more readily displaced, moved or actuated by means of an intermediate mechanical device which increases the power derived from the power source. For example, pulley and block arrangements serve as such an intermediate power multiplying device and, gears of varying diameter arranged in gear trains represent other mechanical forms of power multiplication. In the latter instance, a power source is connected to one end of the gear chain via a drive shaft while the opposite end of the gear train is connected to the power load. In still other more conventional instances, gear transmissions and the like are employed for converting or translating power from a power source to a working load.

Although these devices have been successfully operated for their intended purposes, many of the devices are complex and are bulky so that they cannot be readily accommodated into modern day power and energy applications. In other instances, the weight-to-strength ratio is extremely high so that the device is not feasible for many applications.

Therefore, a long standing need has existed to provide a power multiplying apparatus which will readily translate or convert power from an input source to an output load which is increased or converted to a more powerful energy application.

SUMMARY OF THE INVENTION

Accordingly, the above problems and difficulties are obviated by the present invention which provides a novel power multiplying apparatus for translating a power input into an increased power output via a plurality of serially arranged power multiplying modules. In accordance with the present invention, each module operates in a scissor-like manner and comprises at least four links having adjacent ends of each link pivotally coupled together to form a parallelogram geometrical configuration. Selected pivot connections of the links are fixed and carried on a load number respectively while other selected pivot connections are connected to a pair of contrarotating wheels constituting a differential mechanism via mid-links whereby a scissors action is achieved as the wheels rotate in an oscillatory manner.

Therefore, it is among the primary objects of the present invention to provide a novel power multiplier incorporating a novel scissors mechanism for translating a power input to an increased power output.

Another object of the present invention is to provide a novel power multiplier whereby a plurality of scissors arrangements or mechanisms may be arranged in a serial manner to increase the power input at one end by achieving an increased power output at the other end.

Another object of the present invention is to provide a novel energy conversion device whereby power input is increased even though distance or displacement of the input device is the same as distance or displacement of the output means.

Still another object of the present invention is to provide a novel power conversion means incorporating a plurality of power multiplier modules or units whereby input displacement and power is increased by power multiples but distance remains the same.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
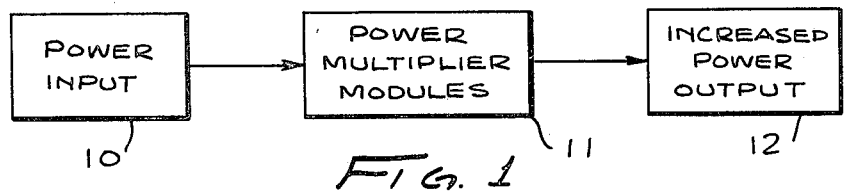
FIG. 1 is a block diagram illustrating the incorporation of power multiplier modules in accordance with the present invention.

Referring to FIG. 1, a block schematic drawing of a power multiplying apparatus is illustrated wherein a device of a conventional design is represented by a power input characterized by numeral 10. The power input device may take the form of an electric motor, a hydraulic or pneumatic piston and assemblage or any other electro, electromechanical, mechanical or electrical device. Such a device may be operated from a conventional power source. However, it is to be understood that the present invention is not to be considered a power source since external power is required to operate the mechanism of the present invention. A block characterized by numeral 11 indicates a power multiplier module or unit which is operably connected to the power input 10 by any suitable means so that the module will operate in accordance with the introduction of energy provided by the power input. The inner connection means between the power input and the power multiplier modules may take the form of gears, linkages or other operable devices for translating the movement of the power input to the power multiplier module.

Character 12 identifies a power output mechanism which is of an increased value over that provided by the power input 10. The difference in the power derived from unit or means 12 resides in the multiplication factor of the module or unit 11. The power output 12 is coupled to the module 11 by any suitable motion or movement translating device such as gears, pistons, conversion linkages or the like. It is emphasized that the output device 12 is not the subject matter of the present invention and that the present invention relates only to the power multiplier module or unit as a single apparatus or as used in a bank or slave units in multiple form. In the following description of the present invention relating to the power multiplier module, a pair of modules will be described wherein one is a driving unit while the other is a slave or driven unit.

Figure 2:
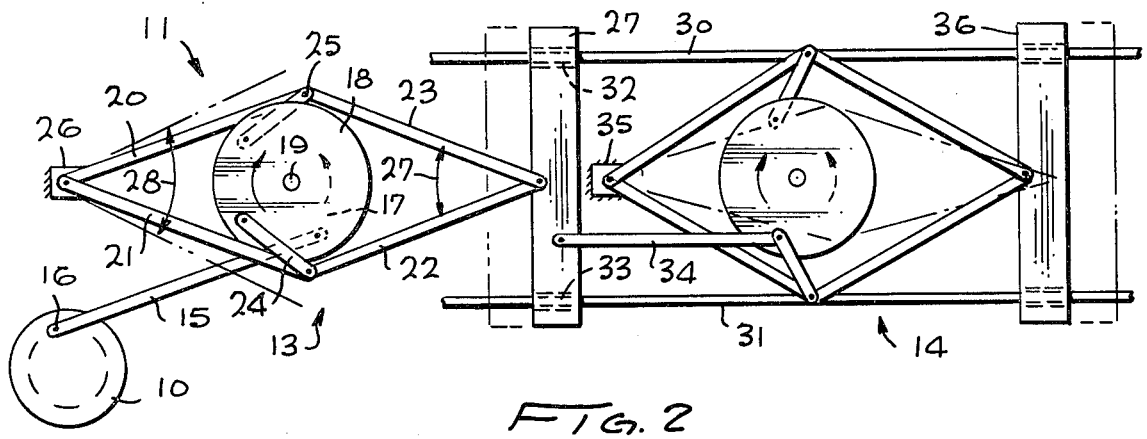
FIG. 2 is a plan view of the novel power multiplier modules employed in the system shown in FIG. 1.

Referring now in detail to FIG. 2, the novel power multiplier module is indicated in the general direction of arrow 11 wherein the driving unit of the pair is illustrated by numeral 13 and the driven unit of the pair is illustrated by the numeral 14. The power input means or device 10 is illustrated as a rotary device having a lever arm 15 pivotally attached to the device 10 by a pivot connection 16. The opposite end of the lever arm 15 is pivotally attached to one of a pair of differentially operated gears and the selected gear attached to the end of lever arm 15 is indicated by numeral 17. The other wheel or gear is indicated by numeral 18 and it is to be understood that the wheels or gears are coaxially disposed with respect to one another and are operated to revolve in opposite directions on a fixed shaft 19.

The power multiplier module 13 further includes four links identified by numerals 20, 21, 22 and 23 respectively which are arranged in a general parallelogram geometric form having the opposite ends of each link pivotally attached to the end of an adjacent link. Therefore, a continuous arrangement is provided wherein each link is pivotally attached to an adjacent link end and a general scissors arrangement is provided by further including intermediate links 24 and 25 respectively. One end of each intermediate link is attached to an adjacent pivot connection joining a pair of the scissors links. For example, intermediate link 24 is pivotally attached at one end to the exterior surface of gear or wheel 18 while the opposite end of link 24 is pivotally connected to the pivot connecting the adjacent ends of links 21 and 22. For intermediate link 25, one end thereof is pivotally attached to the exterior surface of wheel or gear 17 while its opposite end is pivotally connected to the adjacent connected ends of links 20 and 23. It is also to be observed that the pivot connection between the adjacent ends of links 20 and 21 is attached to a fixed member 26 so that one end of the scissors arrangement is secured while the opposite end of the scissors arrangement represented by the pivotal connection of the adjacent ends of links 22 and 23 is connected to a movable member such as a bar 27. Therefore, as the scissors arrangement is advanced and retracted, one end remains stationary while the opposite end will move with respect thereto. The advanced position is shown in solid lines and is represented by a small angle indicated between the arrows with respect to the links 22 and 23 and such a small angle is represented by numeral 27. When the scissors arrangement is retracted, the links are shown in broken lines and a larger angle indicated by numeral 28 is illustrated between the links 20 and 21. Therefore, it can be seen that upon rotating of the input power device 10, link 15 will operate the wheel 17 so as to rotate in a clockwise direction to advance the links 20 and 23. By gear means, the wheel or gear 17 operates the gear or wheel 18 so as to rotate in a counterclockwise direction to advance links 21 and 22 via the intermediate link 24. When the intermediate links so advance their respective pair of links, the scissors arrangement advances and bar 27 will move from the dotted line or broken line position to the position shown in solid lines. Therefore, it can be seen that when the links are shown as in solid lines, the scissors mechanism is advanced and the bar 27 is moved. When the links 20-23 inclusive are in their advanced or broken line position, the scissors mechanism is retracted and the bar 27 is moved into the broken line position.

In the present instance, the bar 27 is arranged to slideably move on parallel rods 30 and 31 by means of lineal bearings 32 and 33 carried on the opposite ends of the bar 27. It is to be understood that the bar 27 is an output device and that the bar will move in a linear line for a prescribed distance.

The multiplier unit or module 14 is driven by the bar 27 via an interconnecting member 34. The unit is identical to the scissors arrangement 13 including the fixed mounting 35 at one end of the scissors arrangement and the movable bar 36 connected to the opposite end of the scissors arrangement. In a similar manner to bar 27, the bar 36 slideably moves on the rods 30 and 31. Therefore, the power output from the power multiplier module 13 drives the slave or driven module 14 so that the power is additionally increased and bar 36 represents the increased power output. Other devices may be readily attached to the bar 36 so as to be driven thereby whereas the mechanical advantage is taken therefrom.

Figure 3:
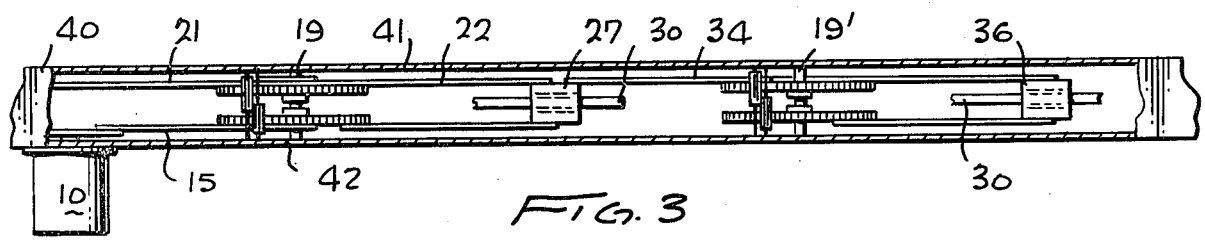
FIG. 3 is a side elevational view of the power multiplier modules shown in FIG. 2.

Referring now in detail to FIG. 3, it can be seen that the driving unit 13 and the driven unit 14 may be readily enclosed within a housing 40 having a top plate 41 and a bottom plate 42. The housing is fixed and the respective shafts 19 and 19' of the units are fixed thereto. Also, the fixed blocks 26 and 35 are also secured to the housing. The rods 30 and 31 are carried on opposite ends of the housing so that the movable bars 27 and 36 move thereon with respect to the housing. The input device is illustrated as a motor and is indicated by numeral 10 as previously described.

Figure 4:
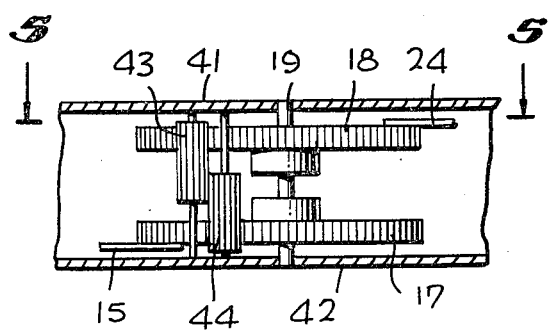
FIG. 4 is an enlarged cross sectional view of the differential wheels employed in the power module.
Figure 5:
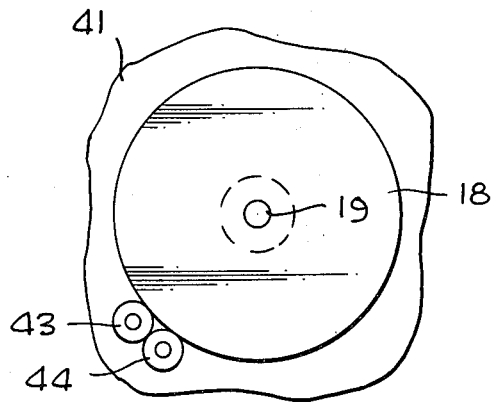
FIG. 5 is a sectional view taken in the direction of arrows 5—5 of FIG. 4 showing the differential means or mechanism.

Referring now to FIGS. 4 and 5, the intermediate drive means for expanding and retracting the scissors arrangement is illustrated in detail. The shaft 19 is fixed to the upper and lower plates 41 and 42 of the housing 40 and the gears or wheels 17 and 18 are arranged to move thereon by respective bearings in fixed spaced apart relationship. Diffferential movement of the gears 17 and 18 is achieved by means of meshing elongated gear wheels 43 and 44 which are not only meshed together but are meshed with the teeth of the gears 17 and 18 respectively. For example, gear 43 is meshed with the peripheral gears or gear 18 while the teeth of gear 17 are meshed by the teeth of gear 44. Inasmuch as gear 17 is driven by the link or lever arm 15, the gear 44 is driven thereby so as to drive the gear 43 and the gear 18. The rotation of gears 17 and 18 is transmitted to the scissors linkage 20-23 respectively by the intermediate links 24 and 25.

Therefore, it can be seen that the novel power multiplier modules of the present invention provides a unique construction for increasing and obtaining mechanical advantage from a power input 10 to the increased power output 12. The modules comprise substantially an expanding the retracting scissors mechanism which may be arranged in multiple modules in a series relationship to collectively provide increased power output. A source of power is introduced to one end of the power multiplying module for driving the modules so that an output device such as the sliding bars move a prescribed distance. The distance moved is substantially greater than the rotational distance travelled by the drive intermediate means so that power increase is reflected. By the law of work, it is well known that effort times effort distance equals resistance times resistance distance and therefore, the mechanical advantage can be determined by this measurement.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a power multiplier apparatus for translating an input power force into an increased power output, the combination comprising:
   a power multiplier unit having a scissors arrangement of links so as to laterally expand and retract in accordance with application of said input power force to one side of said scissors arrangement;
   a selected end of said scissors arrangement fixed so that its opposite end is advanced as said scissors arrangement laterally expands;
   a movable member coupled to said scissors arrangement at its end opposite to its selected end for moving in response to said scissors arrangement constituting an increased power output;
   a pair of contra-rotating wheels;
   intermediate links pivotally connected at their opposite ends to said wheels and said scissors arrangement respectively for translating movement from said wheels to expansion and retraction of said scissors arrangement; and
   said wheels are coaxially disposed with respect to each other and are situated within the links of said scissors arrangement.

2. The invention as defined in claim 1 wherein:
   a slaved scissor arrangement identical to said first-mentioned arrangement is operably connected to said movable output member.

3. The invention as defined in claim 2 including:
   intermeshed gearing operably coupling said pair of wheels together for producing said contra-rotation of said wheels.

4. The invention as defined in claim 3 wherein:
   said wheels and said movable output member are operably carried on a fixed base.

5. The invention as defined in claim 4 wherein:
   each of said intermediate links are coupled to a different one of said pair of wheels and on the exterior surface thereof respectively.

* * * * *